(12) United States Patent
Parks

(10) Patent No.: US 6,630,014 B1
(45) Date of Patent: Oct. 7, 2003

(54) MIST ELIMINATOR

(75) Inventor: Clinton R. Parks, Loveland, OH (US)

(73) Assignee: Kadant Black Clawson Inc., Mason, OH (US)

(*) Notice: Subject to any disclaimer, the term of this patent is extended or adjusted under 35 U.S.C. 154(b) by 52 days.

(21) Appl. No.: 10/030,964

(22) PCT Filed: Jul. 12, 2000

(86) PCT No.: PCT/US00/18964

§ 371 (c)(1),
(2), (4) Date: Jan. 9, 2002

(87) PCT Pub. No.: WO01/03803

PCT Pub. Date: Jan. 18, 2001

Related U.S. Application Data
(60) Provisional application No. 60/143,406, filed on Jul. 12, 1999.

(51) Int. Cl.[7] ................................................. B01D 45/12
(52) U.S. Cl. ........................ 95/269; 55/385.1; 55/345; 55/395; 55/396; 55/423; 55/455; 55/456; 162/189
(58) Field of Search ............................ 95/269; 55/385.1, 55/396, 423, 455, 456, 457, 394, 395, 466, 345; 162/189

(56) References Cited

U.S. PATENT DOCUMENTS

| | | |
|---|---|---|
| 2,393,112 A | 1/1946 | Lincoln |
| 2,506,298 A | 5/1950 | Griffen |
| 3,778,980 A | 12/1973 | Vancini |
| 3,902,876 A | 9/1975 | Moen et al. |
| 4,015,960 A | 4/1977 | Nutter |
| 4,154,644 A | 5/1979 | Ericsson |
| 4,155,839 A | 5/1979 | Seifert et al. |
| 4,239,513 A | 12/1980 | Paul et al. |
| 4,349,360 A | 9/1982 | Schuurmans et al. |
| 4,364,754 A | 12/1982 | Diachuk |
| 4,382,807 A | 5/1983 | Diachuk |
| 4,460,386 A | 7/1984 | Diachuk |
| 4,564,443 A | 1/1986 | Bliss |
| 4,602,925 A | 7/1986 | Huffman |
| 4,622,132 A | 11/1986 | Chupka |
| 4,629,481 A | 12/1986 | Echols |
| 4,648,890 A | 3/1987 | Kidwell et al. |
| 4,838,906 A | 6/1989 | Kiselev |
| 5,238,538 A | 8/1993 | Jagannadh et al. |
| 5,300,132 A | 4/1994 | Konijn |
| 5,391,294 A | 2/1995 | Mercier |
| 5,462,585 A | 10/1995 | Niskanen et al. |
| 5,496,394 A | 3/1996 | Nied |
| 6,190,438 B1 | 2/2001 | Parks |

FOREIGN PATENT DOCUMENTS

| | | |
|---|---|---|
| EP | 0 195 464 A1 | 9/1986 |
| EP | 0 267 285 A1 | 5/1988 |
| EP | 0 495 304 A1 | 7/1992 |
| WO | 98/29179 * | 7/1998 |

* cited by examiner

*Primary Examiner*—Duane Smith
(74) *Attorney, Agent, or Firm*—Wegman, Hessler & Vanderburg

(57) ABSTRACT

Improved mist eliminator (50) for use in pulp washers, deinking cells and the like, and methods of use are disclosed. A cyclonic gas/liquid separator (50) is provided that includes an elongated housing (100) with a cyclonic flow inducing vane assembly (108) disposed at a medial location along the length of the housing (100) to divide the separator (50) into two tandem cyclonic action zones (150, 152) of approximate equal volume within the housing (100). An initial separation is effected in the first cyclonic action zone (150) followed by final separation in the downstream or second cyclonic action zone (152).

30 Claims, 6 Drawing Sheets

MIST ELIMINATOR

CROSS-REFERENCE TO RELATED APPLICATIONS

Priority filing benefit of (1) International PCT application PCT/US00/18964 filed Jul. 12, 2000, and published under PCT 21(2) in the English language and (2) U.S. Provisional Application Ser. No. 60/143,406 filed Jul. 12, 1999.

BACKGROUND OF THE INVENTION

The present invention relates to an apparatus for the separation of gas and liquid from a flowing mixture of gas and liquid. In particular, the invention relates to an improved gas/liquid separator of the cyclonic variety.

In various industrial processes, such as in washing wood pulp, it is advantageous to draw air from over a reservoir of liquid by means of a vacuum provided by a blower intake. The air is usually drawn through the blower and provided under pressure to a portion of an apparatus, such as a pulp washer, to create a region of positive pressure. However, the air drawn by the vacuum created by the blower may have liquid or solid particles entrained therein, particularly where the liquid has foam or froth covering its surface. For proper operation of the blower and the apparatus, it is necessary to separate the entrained particles from the air before the air is taken in by the blower.

Various means of separating a gas from a gas/liquid flow mixture are known in the art. In particular, separation of liquid and solid particles from gas streams by cyclonic action is known. For example, a contact-and-separating element of a vortex tray of a liquid-gas mass-transfer apparatus using cyclonic separation is disclosed in U.S. Pat. No. 4,838,906 to Kiselev. Similarly, a dust collection system using cyclonic separation is disclosed in U.S. Pat. No. 2,393,112 to Lincoln.

In a typical cyclonic separator, a gas mixture having particles entrained therein is drawn vertically upward. A cyclonic rotation is imparted to the flowing mixture, typically by means of helical or spiral vanes. Centrifugal force causes heavier particles to be forced radially outwardly toward the outer periphery of the flow mixture where the particles drop back downward under the force of gravity. The gas mixture without the heavier particles continues upwardly.

Cyclonic gas/liquid separators may be used in a flat bed wood pulp washer generally similar in construction and mode of operation to a Fourdrinier paper machine incorporating an endless foraminous belt ("wire"), a headbox which delivers the pulp suspension in a pulping liquor to one end of a horizontally traveling upper run of the wire, successive washing zones along the length of the run, and means at the downstream end of the run for receiving and removing the resulting washed pulp. Pulp washers of this type, manufactured by the assignee of the present invention in accordance with Ericsson U.S. Pat. No. 4,154,644 of 1979, have been notably successful, and the present invention was developed to improve the operation and results obtained by such pulp washers.

The operation of a pulp washer of this type may be described as being according to the displacement washing principle. That is, once the pulp mat has been formed, it is not redilined, but simply is subjected to repeated washings by application on top of the mat of washing liquid with the liquid applied in each washing zone having a lower concentration of liquor than the filtrate from the preceding zone. The liquid applied in each zone enters the mat substantially en masse and thereby displaces the liquid which was carried into the zone in the mat and causes it to drain therefrom through the wire.

The mechanical elements of a washer according to the Ericsson patent include a hood which encloses the entire apparatus downstream from the headbox, and a series of receptacles below the operating run of the wire in sealed relation with the hood. In operation, vacuum is applied to the receptacles, and/or gas pressure is developed within the hood, to augment the action of gravity in forcing the washing liquid through the pulp mat on the wire. Gases and vapors drawn through the wire into the upper spaces in the receptacles are recycled back to the hood to increase the pressure differential above and below the wire.

In the pulp washer, a gas/liquid separator or mist eliminator is attached to each of the receptacles at a gas outlet on top of the receptacle to thereby permit the gases and vapors to be drawn from the flat top receptacles through the mist eliminator to the suction side of a pump or fan that recycles the gas, in this case air, to the hood. However, entrained within the gases and vapors drawn from the receptacle are particles of mist and foam from the space between the wire and the pulping liquor.

Prior art mist eliminators employing cyclonic separating means have been used to remove particles of mist and foam from the gas flow before the gas reaches the pump or blower. The typical mist eliminator has a cylindrical housing arranged vertically proximate the top of the receptacle with a vacuum line attached to the top end. The gas inlet is positioned above the level of the liquor with cyclonic-flow-inducing means, typically helical vanes or a swirler, positioned within the inlet. Droplets of mist and particles of foam are hurled radially outwardly by centrifugal force from the gas/liquid flow to drop back down into the liquor under the force of gravity.

However, in many cases the upward draft of gas through the mist eliminator impinges upon the falling, separated liquid droplets. This tends to retard the separation of undesired droplets of mist and particles of foam entrained within the gas flow. Thus, incomplete separation of foreign matter from the gas results. Mist and foam entrained within the gas flow result in a lower pressure differential being developed between the hood and the receptacle, thereby reducing the efficiency of the pulp washer.

In accordance with the disclosure of WO Publication 98/29179 (of common assignment herewith) an improved mist eliminator is provided wherein an annular zone is formed in the separator where falling droplets of separated water and liquid drain downwardly in the device substantially without resistance from countercurrent flow of gas and liquid.

Although the mist eliminator set forth in the aforementioned WO Publication has proven commercially successful, it was found that in some instances, where dense foams were encountered in the suction box, turbulence was actually increased in the liquid directly beneath the separator, leading to inefficient separation. Accordingly, there is a need in the art for a mist eliminator device of enhanced efficiency that is capable of separating foam components that may exist in the suction box.

SUMMARY OF THE INVENTION

These and other objects of the invention are met by the provision of a cyclonic separation device wherein two distinct cyclonic action zones are provided to perform the desired separation of the liquid components from the gas component. The device includes a generally elongated cylindrical housing with inlet end and outlet end disposed at opposite axial ends of the cylinder. Within the cylinder and at an approximate medial position along the longitudinal axis of the housing, a swirl imparting vane structure is located. This vane structure forms a boundary defining a upstream cyclonic zone and downstream cyclonic action zone. The location of the swirl imparting vane structure at an approximate mid-point along the length of the cylinder contrasts with many prior art designs where the swirl vanes are located adjacent the inlet end of the separator.

The outlet of the housing is connected to a suitable suction source which draws the gas/liquid mixture to be separated into the inlet portion of the housing, passing generally upwardly through the housing in an upstream to downstream direction. The mixture is first separated in the upstream cyclonic zone with an additional separation performed in the downstream cyclonic action zone.

Other objects and advantages of the invention will be apparent from the following description, the accompanying drawings and the appended claims.

DETAILED DESCRIPTION OF THE PREFERRED EMBODIMENT

Figure 1:
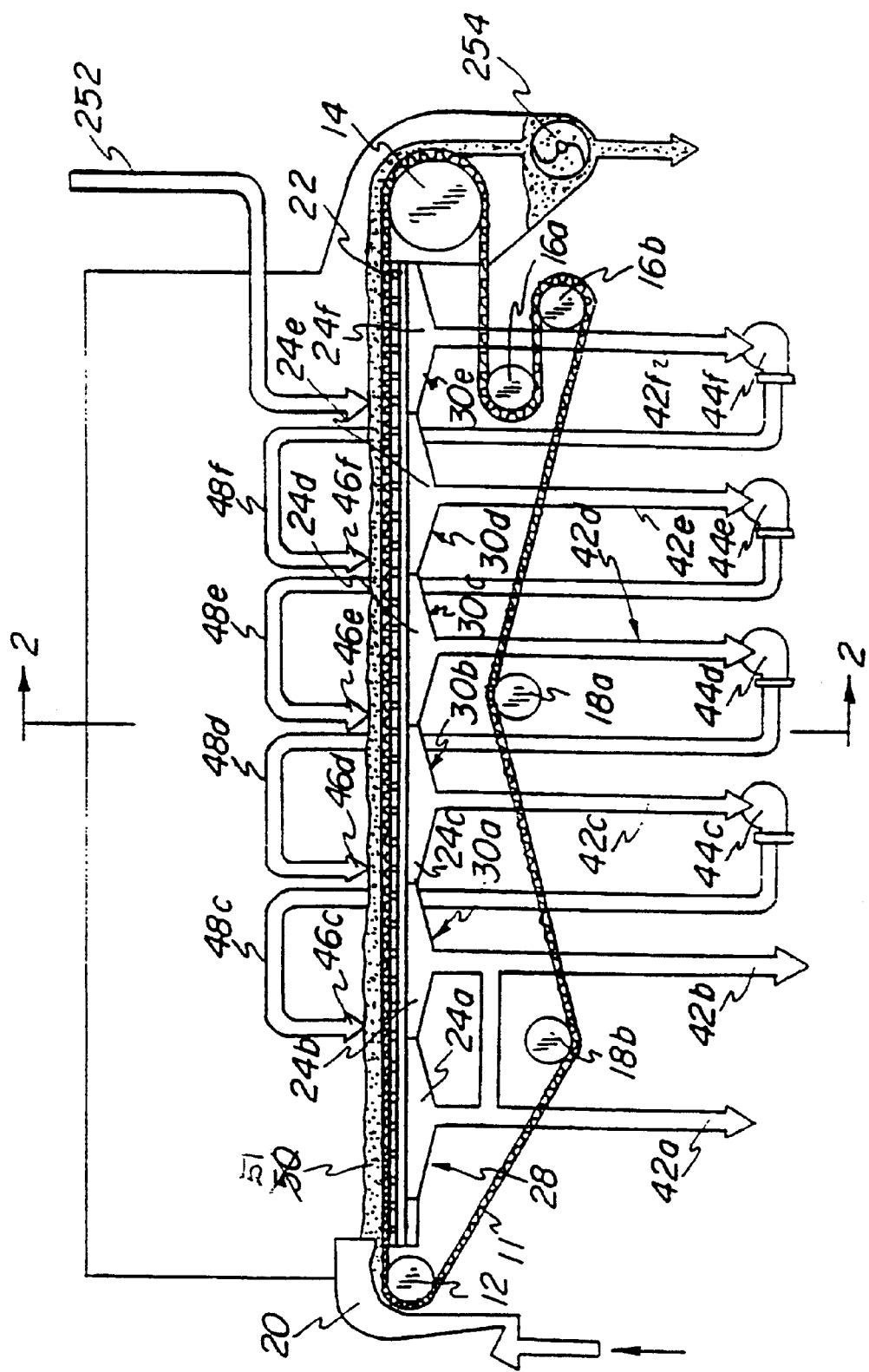
FIG. 1 is a view in side elevation showing a horizontal Ericsson-type of washer that may incorporate, as a component thereof, an improved mist eliminator in accordance with the invention

Turning now to FIG. 1, there is shown diagrammatically a pulp washing apparatus and system in which the improved mist eliminator of the present invention may be advantageously employed. As shown, an endless foraminous belt 11, usually a wire of woven plastic filaments, is trained around a breast roll 12 at the upstream wire run location, a couch roll 14 at the downstream run location and around drive rolls 16a, 16b, and tensioning rolls 18a, 18b on the return run of the belt to the upstream location. A headbox deposits the pulp suspension to be washed onto the upstream end of the wire run.

A smooth, foraminous material 22 of low frictional coefficient such as a perforated polyethylene sheet is provided below and in supporting relation to the upper run of the wire 11. Disposed directly underneath the sheet and mounted on a frame (not shown) are a plurality of receptacles 24a–24f. Each of these is, in effect, a suction box, bounded at the top by the perforated sheet. As more fully explained in the Ericsson patent, the receptacles 24a–24f are interconnected and operated so that they form a series of successive zones along the path of the wire run comprising a formation zone 28 adjacent the headbox 20 and consecutive washing zones 30a–30e, the last of which 30e is adjacent the downstream end of the wire run.

A hood 40 is supported by a frame (not shown) and is positioned in enclosing relationship to the zones 28 and 30a–30e. As most clearly shown in FIG. 2, the hood provides a seal over the receptacles.

Turning back to FIG. 1, each of the receptacles is provided with a drain line 42a–f. Drain lines 42c–f communicate with pumps 44c to 48f to return liquid to shower heads 46c–f through liquid return lines 48c to 48f to provide wash water to effect displacement washing of the mat 51 of fibers as it travels from the upstream to downstream direction along the upper run of the wire 11. Clean water or white water is passed through line 252 so that the pulp mat adjacent the couch roll is washed with relatively clean water. The washed pulp after leaving washing zone 30e exits the device via the assistance of auger 254.

Water drained from receptacle 24b through drain line 42b is forwarded to an evaporator tank, with water drained from upstream receptacle 42a forwarded to a blow tank. Lines 42a and 42b are connected via valve (not shown) so that water from line 42a may be directed to the evaporator if desired and, conversely water from line 42b could, if desired, be channeled to the blow tank.

In simplified form, the apparatus of FIG. 1 serves to evenly distribute pulp fed from the headbox onto the moving wire. In the formation zone 28, pulp is dewatered from inlet consistency to displacement consistency, forming a pulp mat. Receptacles 24a–e serve as suction boxes under the wire to collect the liquid passing therethrough.

Displacement washing of the mat occurs when the mat goes under the shower where the filtrate from each succeeding washing stage flows onto and through the pulp. The device depicted in FIG. 1 employs multiple stages of displacement washing, the number of which will depend on the finish and the washing efficiency required. Dewatering and displacement of shower liquid is a function of the arrangement of the receptacle (suction box) pumps and a blower (explained thereinafter) and the hood.

Figure 2:
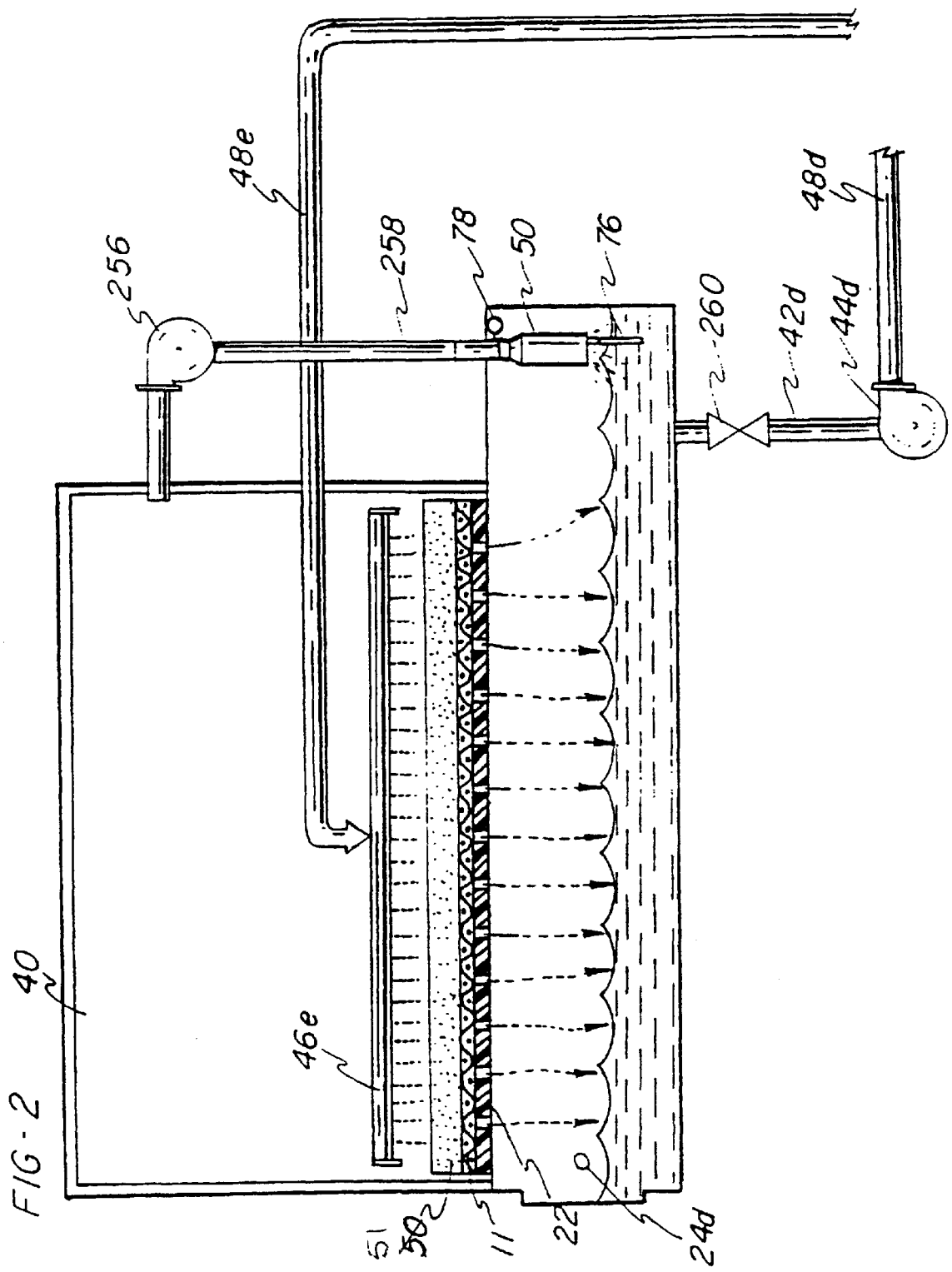
FIG. 2 is a cross-sectional view taken along the lines and arrows 2—2 of FIG. 1 and detailing the system location of the improved mist eliminator of the invention.

Turning now to FIG. 2 it can be seen that gas (usually air) is provided to the hood by means of blower 256. Air from each suction box is returned to the blower via line 258. A pressure differential of between about 1–4" Hg exists between the hood and the suction box atmosphere so that this pressure differential provides the driving force for the shower liquid to flow through the mat on the wire.

The hood maintains a seal between the atmosphere and the receptacle. The gauge value of the pressure in the hood may be positive, zero or negative depending on the desired washer operation. Filtrate from line 48e is used to provide wash water to shower head 46e. Filtrate from receptacle 24d is drained through line 42d where it is pumped by pump 44d to upstream shower head 46d (See FIG. 1). Line 42d is provided with a liquid level control valve 260 operatively associated with pump 44d to control the liquid level inside of the receptacle 24.

Disposed above the liquid level in receptacle 24d is improved liquid/gas separator 50 of the invention. Separator 50 is mounted in the receptacle 24d. Drainage from the separator passes directly into the liquid in the receptacle 24d via drain tube 76. A valve 78 controls the flow of gas back to the suction side of blower 256.

Although separator 50 is shown mounted within suction box 24d, it is to be appreciated that it could also be spaced closely adjacent to the box 24*d*. The term proximate as used herein is intended to cover mounted arrangements where the separator is mounted in, contiguous to, or closely adjacent the receptacle or suction box provided that it is located upstream from a the control valve 78 that is used to regulate the fluid flow through the separator device. This disposition contrasts sharply with the disposition of the mist eliminators in many prior art Ericsson devices in which the mist eliminators were located close to the fan or blower. In these prior art devices a plurality of receptacles were connected to the mist eliminator via a manifold arrangement and lengthy inlet or feed line to the mist eliminator.

The separator 50 serves to separate foam and liquid from the gas that is to be recycled to the hood by blower 256. Foam and liquid separation have become critically important as higher soap content pulps such as Southern Pine Kraft pulps are increasingly used and as washer throughput rates are increased.

Figure 3:
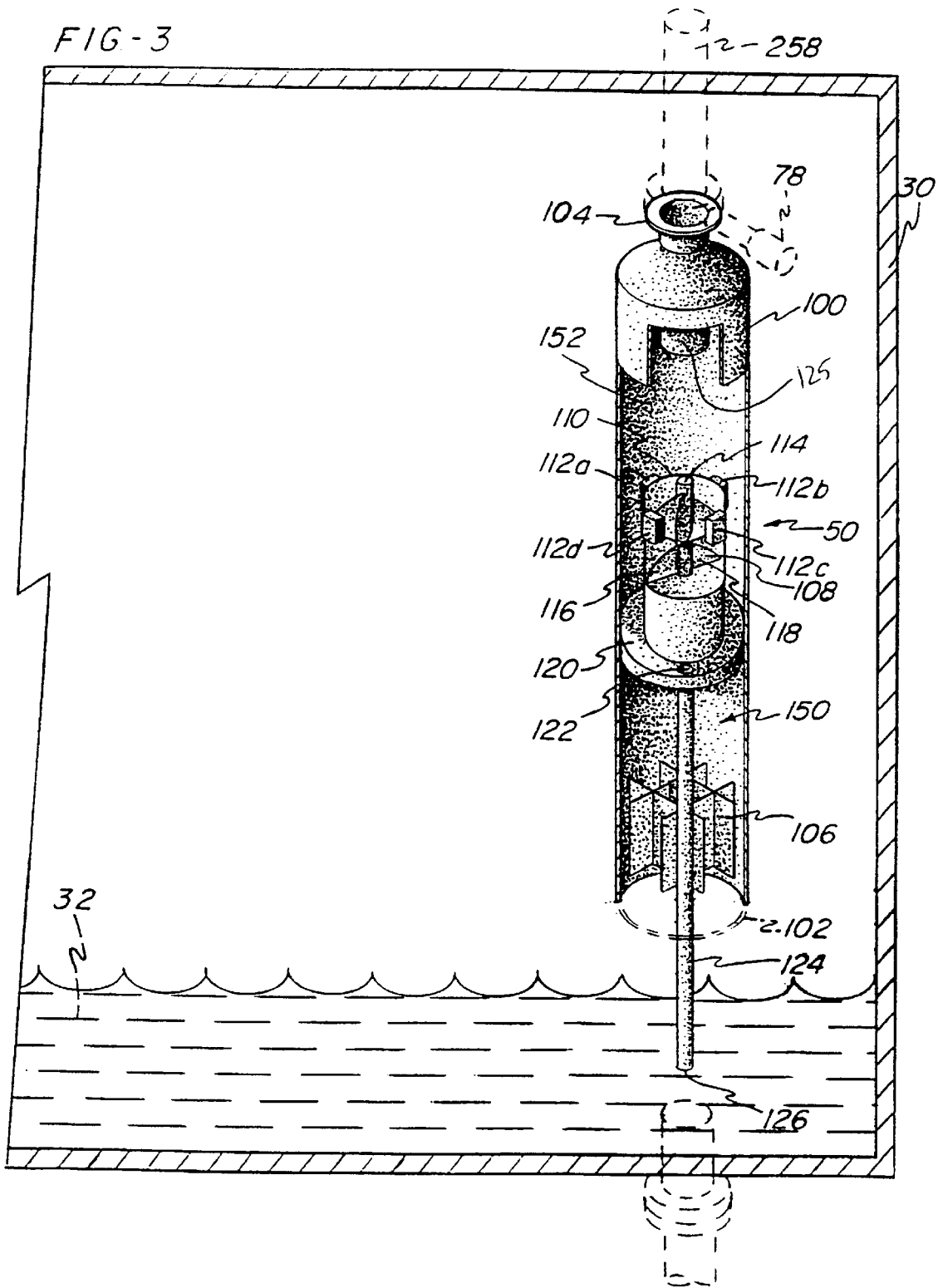
FIG. 3 is a partially broken away side elevational view of a improved mist eliminator in accordance with the invention shown in its position in a suction box receptacle of the type provided in Ericsson washers
Figure 4:
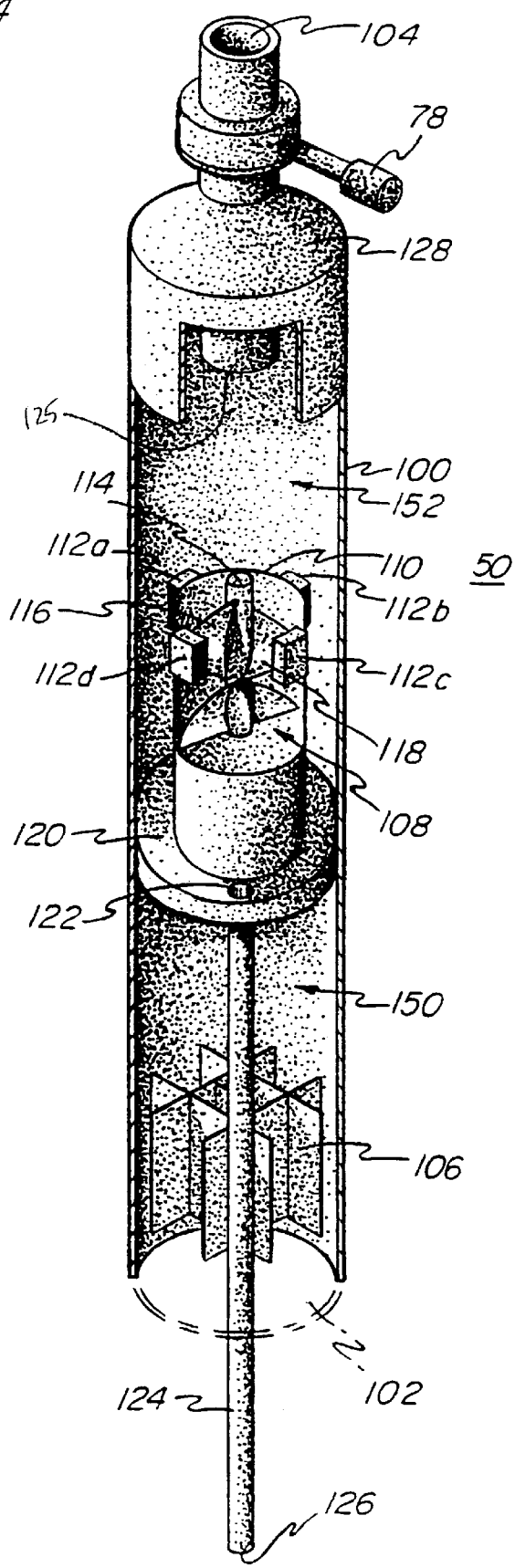
FIG. 4 is a partially broken away side elevational view of the improved mist eliminator of the invention.
Figure 5:
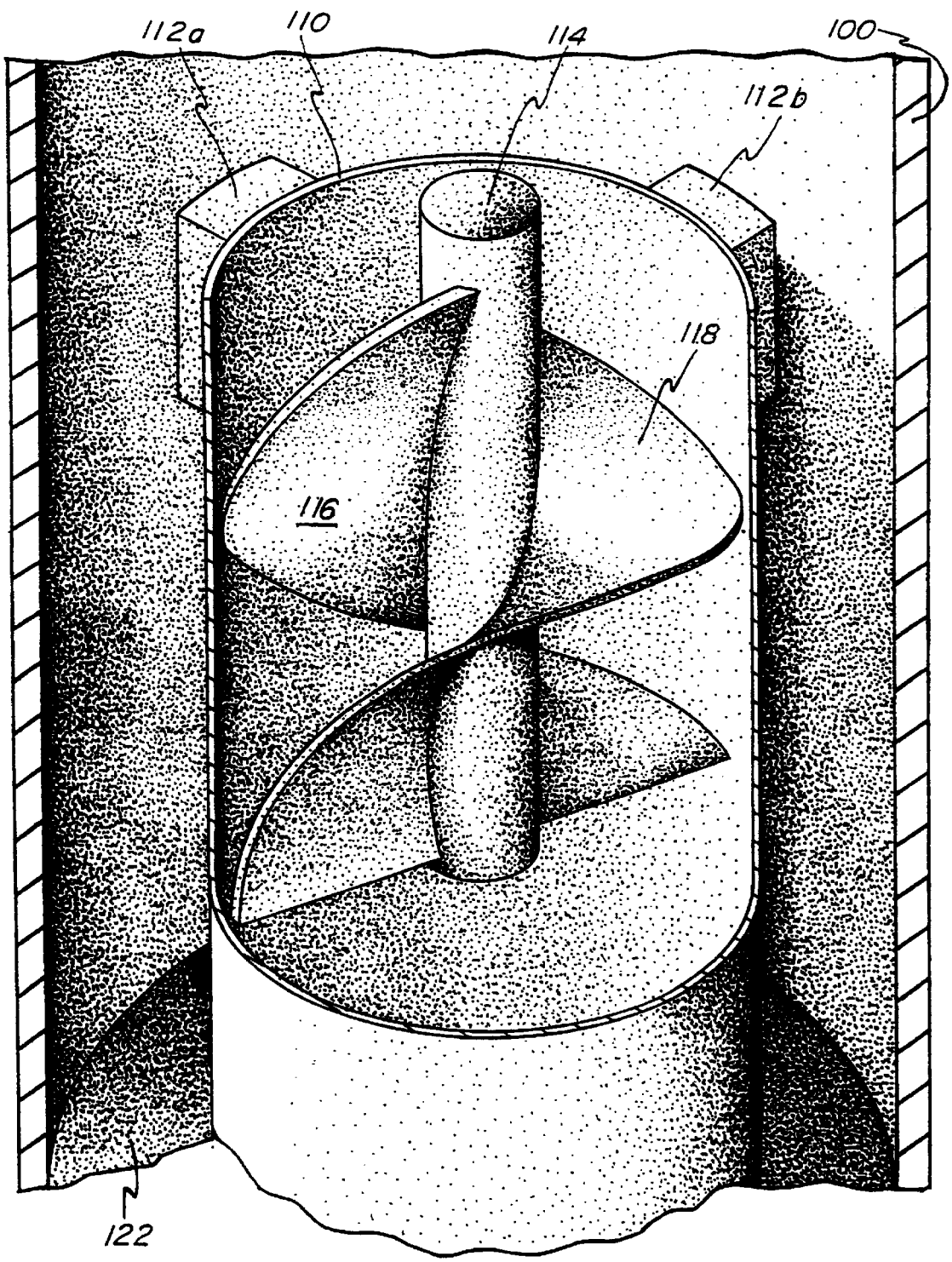
FIG. 5 is a magnified cutaway side elevational view of the swirl imparting vane assembly of the mist eliminator shown in FIG. 4.

Turning now to FIGS. 3 and 4, the separator 50 is shown in greater detail. As shown, the separator comprises an elongated cylindrical housing 100 having as upstream inlet 102 and downstream outlet 104 provided at opposite ends along the longitudinal axis of the housing. The separator of mist eliminator is oriented vertically in the receptacle 30 of the pulp washer with the inlet of the housing spaced above the pulping liquor level 32.

At the upstream end of the housing, an air straightening baffle 106 may be securely disposed via welding, brazing, or other attachment means to the inside of the housing. Spaced above baffle 106 is a cyclonic flow inducing vane assembly 108. The assembly 108 is housed in cylindrical shroud 110, coaxial to the longitudinal axis of the housing. The shroud and vane assembly are secured in the housing by welding of the four spacer tabs 112*a,b,c,d* to the inside wall of the cylindrical housing.

The vane assembly comprises a central rod 114 coaxial with the housing axis and secured to the rod and shroud are a pair of swirl imparting vanes 116,118. As shown, each of the vanes is in the form of a spiral flight with each flight spanning 270° of the circumference of the rod 114. The pitch (length) of each flight is approximately 1.5 times the diameter of the rod. The flights 116, 118 are out of phase with each other at an angle of 180°. The configuration and spacing of the flights is not critical provided that they impart a cyclonic swirling motion to the liquid/gas mixture traveling through the separator in an upstream to downstream direction from the inlet to the outlet.

Fixed to the outside of the shroud and inside of the housing is an annular rim 120 which provides an air tight seal in the area between the shroud and inside wall of the housing. The rim 120 is inclined relative to the longitudinal axis of the housing at an acute angle of about 10–25°; preferable 15°. At the lowest point on the rim (or, stated differently, at the point on the rim closest to the liquor level 32) an opening 122 is provided to allow for drainage of liquid. A drain tube 124 may be provided in communication with the opening 122 to drain directly into the pulp liquor. As shown, the tube drain exit 126 is actually submersed in the liquor. Similar to the disclosure of WO Publication 98/29179, the rim and housing define a substantially cylindrical region wherein droplets of mist and foam separated from the gas flow travel downwardly toward the drain with reduced resistance from the counter flowing gas. This improves mist and foam separation from the mixture.

At the downstream, outlet end of the housing, a vortex finder tube 125 is secured to the frusto-conical end 128 of the outlet. The outlet 104 communicates with return line 258 to return gas (usually air) to the blower 256 (FIG. 2). Flow rate is controlled via valve 78.

In accordance with the invention, a first cyclonic action zone 150 is provided in the cylindrical housing between the baffle 106 and the vane assembly 108. In addition, a second cyclonic action zone 152 is provided in the housing between the assembly 108 and the outlet 104. In practice, it has been found that the first and second cyclonic action zones should be approximate equal volume.

In one field application of the mist eliminator disposed as shown in the suction box receptacle of an Ericsson type washer, substantial amounts of the dense foam floating along the liquor level were desirably drawn into the zone 150 for preliminary separation therein. After this initial separation, the gas/liquid mixture was further separated in the second cyclonic action zone 152. Location of the vane assembly 108 at a generally medial disposition within the housing provides a more elevated position that in some of the prior art devices and thereby increases head pressure over the opening 122 to improve liquid drainage thru tube 124.

In another aspect of the invention, the improved separation device is used to separate ink particles from a recycled fiber slurry. In typical deinking applications recycled fibers including mixed office waste, and old newsprint etc., are commonly fiberized in a hydrapulper or the like in the presence of chemical additives that are adapted to facilitate separation of the ink particles from the pulp. The ink particles that are dislodged are released from the fiber surfaces due to mechanical and/or chemical reaction are separated from the slurry via dispersion, washing and flotation processes.

The separator 50 of the invention may be ideally used in deinking cells to aid in separation of ink particles from the recycle pulp. In such cells, air bubble generators or the like, with or without chemical flotation enhancement agents, are provided in a cell or series of cells in which the particles are released from the fibers and are carried to the slurry surface. The particles normally float atop the surface in a foamy mass.

Figure 6:
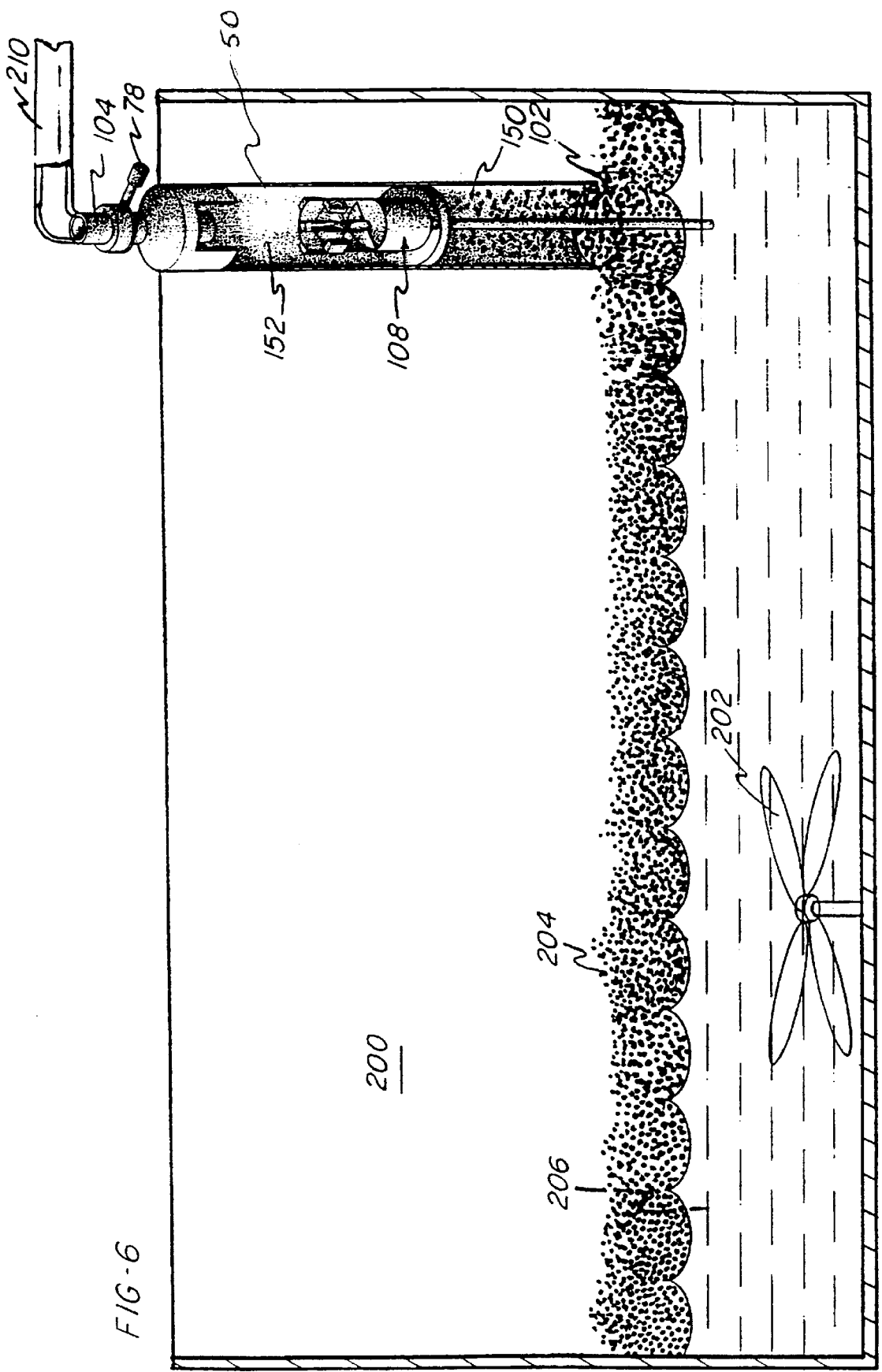
FIG. 6 is a diagrammatic view illustrating use of the improved mist eliminator in a recycle pulp deinking cell.

Turning to FIG. 6 of the drawings, there is shown deinking cell 200 of the type normally encountered in deinking processes. As shown, the cell includes an agitator 202 to promote air bubble formation. The ink particles are floated in the form of a dense foamy mass 204 atop the recycle pulp slurry 206. The separator 50 is spaced over the foam 204. A suction line 210 is connected to the outlet 104 of the separator. In this embodiment, the air straightening baffle normally positioned adjacent the separator inlet is omitted. It is noted that although only one separator 50 is depicted in the drawings, a bank or plurality of the same may actually be employed in conjunction with a deinking cell.

In operation, the vacuum drawn through the line 210 picks the dense mass 204 off the top of the recycle pulp slurry. The foamy mass 204 enters the first cyclonic zone 150 where it is subjected to a preliminary separation, then moving downstream through the vanes and into the second cyclonic action zone 152. The ink particles are lower in specific gravity than the liquid so the cyclonic action causes same to be separated and removed through line 210.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Cyclonic separation device for separation of liquid from a gas and liquid containing stream flowing from an upstream to downstream direction in said device, said separation device comprising a cylindrical housing having a longitudinally disposed axis extending thru said housing, an inlet end and an outlet end disposed at opposing ends of said cylindrical housing and a cyclonic flow inducing vane assembly positioned at an intermediate location along said longitudinal axis and defining a first cyclonic separation zone within said housing upstream from said vane assembly, and a second cyclonic separation zone within said housing downstream from said vane assembly.

2. Cyclonic separation device is recited in claim 1 further comprising a generally cylindrical vane assembly shroud surrounding said vane assembly and coaxially disposed within said cylindrical housing.

3. Cyclonic separation device as recited in claim 2 further comprising an annular rim surrounding said shroud and contiguous with said housing to form an airtight barrier in said housing, said rim being disposed at an inclined angle relative to said longitudinal axis, said rim compromising an opening therein located at a portion of said rim spaced more closely to said inlet than other rim portions for allowing draining liquid flow therethrough.

4. Cyclonic separator as recited in claim 3 further comprising a drain tube connected to said opening for draining liquid from said housing.

5. Cyclonic separator as recited in claim 3 further comprising a flow straightening baffle assembly located in said housing proximate e said inlet, said first cyclonic separation zone located in said housing between said rim and said flow straightening baffle assembly.

6. Cyclonic separator as recited in claim 5 further comprising a vortex finder located proximate said outlet end, said vortex finder comprising a tube disposed along said longitudinal axis, said outlet end of said cylinder including a cap with said vortex tube depending from said cap and terminating in an outlet opening in said cap, said second cyclonic separation zone located between said rim and said cap.

7. Cyclonic separator as recited in claim 2 wherein said vane assembly comprises a rod extending longitudinally in said shroud, and at least one spiral flight extending around at least a portion of said rod, said flight connected to said shroud.

8. Cyclonic separator as recited in claim 7 wherein said vane assembly comprises a first and second spiral screw flight.

9. Cyclonic separator as recited in claim 1 wherein said first and second cyclonic separation zones are of approximate equal volume.

10. In combination with a suction box of a pulp washer or thickener wherein a level of liquid is disposed within said suction box, a gas/liquid separator device, said gas/liquid separator device comprising a cylindrical housing disposed above said liquid level, said housing having a longitudinally disposed axis extending therethrough and an inlet end and an outlet end disposed at opposing ends of said housing, said outlet end being in communication with a suction source to draw a mixture of gas and liquid through said gas/liquid separator device from an upstream to downstream direction for separation of said liquid and said gas;

said gas/liquid separator device further comprising a cyclonic flow inducing vane assembly positioned at an intermediate location along said longitudinal axis and defining a first cyclonic separation zone located in said housing upstream from said vane assembly and a second cyclonic separation zone in said housing downstream from said vane assembly.

11. Combination as recited in claim 10 further comprising a vane assembly shroud surrounding said vane assembly and coaxially disposed within said cylindrical housing.

12. Combination as recited in claim 11 further comprising an annular rim surrounding said shroud and contiguous with said housing to form an airtight barrier in said housing, said rim disposed at an inclined angle relative to said longitudinal axis, said rim comprising an opening therein at a portion of said rim spaced more closely to said inlet than other portions of said rim for allowing drainage of liquid from said second cyclonic separation zone.

13. Combination as recited in claim 12 further comprising a drain tube extending from said opening to said liquid with said suction box.

14. Combination as recited in claim 13 further comprising a flow straightening baffle assembly located in said housing proximate said inlet, said first cyclonic separation zone located in said housing between said rim and said flow straightening baffle assembly.

15. Combination as recited in claim 14 further comprising a vortex finder located proximate said outlet end, said vortex finder comprising a tube disposed along said longitudinal axis, said outlet end of said cylinder including a cap with said vortex tube depending from said cap and terminating in an outlet opening in said cap, said second cyclonic separation zone located between said rim and said cap.

16. Combination as recited in claim 15 where in said vane assembly comprises a rod extending longitudinally in said shroud, and at least one spiral flight extending around at least a portion of said rod.

17. Combination as recited in claim 16 where in said vane assembly comprises a fir and second spiral screw flight.

18. Combination as recited in claim 10 wherein said first and second cyclonic separation zones are of approximate equal volume.

19. In a pulp washer of the type having a horizontally disposed endless wire, drive means for moving said wire from an upstream to downstream location on said wire, headbox means for feeding a pulp suspension to an upstream location on said wire, a suction box receptacle underlying said wire, water shower means positioned over said wire for directing a water shower over said wire and said pulp to wash said pulp whereby some of said water will drain into said suction box receptacle, and vacuum system means for creating suction under said wire to augment flow of wash water through said wire to said suction box receptacle; the improvement comprising a water/gas separator positioned proximate said suction box and draining liquid into said suction box, said separator comprising a cylindrical housing having a longitudinal axis extending therethrough and an inlet end and an outlet end disposed at opposing ends of said housing, said outlet end being in communication with said vacuum system means to draw a mixture of said water and gas from said suction box receptacle through said water/gas separator device from an upstream to downstream direction for separating said water and said gas, said water/gas separator device further comprising a cyclonic flow inducing vane assembly positioned at an intermediate location along said longitudinal axis and defining a first cyclonic separation zone located in said housing upstream from said vane assembly and a second cyclonic separation zone in said housing downstream from said vane assembly.

20. In a deinking cell wherein ink particles are floated in a foamy mass on top of a fiber containing slurry for separation from said slurry, a cyclonic separation apparatus for separating said floated particles from said fiber slurry, said cyclonic separation apparatus comprising a cylindrical housing having a longitudinal axis extending therethrough and an inlet end and an outlet end disposed at opposing ends of said housing, said outlet end adapted for communication with said suction source for drawing said foamy mass containing said ink particles from said deinking cell through said cyclonic separation apparatus from an upstream to a downstream direction, said cyclonic separation apparatus further comprising a cyclonic flow inducing vane assembly positioned at an intermediate location along said longitudinal axis and defining a first cyclonic separation zone located in said housing upstream from said vane assembly and a second cyclonic separation zone in said housing downstream from said vane assembly.

21. Cyclonic separation apparatus as recited in claim 20 further comprising a vane assembly shroud surrounding said vane assembly and coaxially disposed within said cylindrical housing.

22. Cyclonic separation apparatus as recited in claim 21 further comprising an annular rim surrounding said shroud and contiguous with said housing to form an airtight barrier in said housing, said rim disposed at an inclined angle relative to said longitudinal axis, said rim comprising an opening therein at a portion of said rim spaced more closely to said inlet than other portions of said rim for allowing drainage of liquid from said second cyclonic separation zone.

23. Cyclonic separation apparatus as recited in claim 22 further comprising a drain tube extending from said opening to said slurry.

24. Cyclonic separation apparatus as recited in claim 23 wherein said vane assembly comprises a rod extending longitudinally in said shroud, and at least one spiral flight extending around at least a portion of the circumference of said rod.

25. Cyclonic separation apparatus as recited in claim 24 wherein said vane assembly comprises a first and second spiral screw flight.

26. Cyclonic separation apparatus as recited in claim 20 wherein said first and second cyclonic separation zones are of approximate equal volume.

27. Method for separating liquids existing in a gas stream in a processing apparatus of the type having a suction box receptacle with a reservoir of liquid disposed therein, said method comprising;

(1) providing a gas/liquid separator including a generally cylindrical housing, a gas/liquid inlet and a gas outlet disposed at opposing ends of said housing and tandem first and second cyclonic separation zones in said housing, (2) positioning said gas/liquid separator proximate said suction box receptacle;

(3) drawing said gas stream through said first cyclonic separation zone and then through said second cyclonic separation zone; and (4) draining liquids from said separator into said reservoir of liquid.

28. Method for separating ink particles from a fiber containing slurry wherein said ink particles are floated in a foamy mass on top of said slurry comprising the steps of;

(1) drawing said foamy mass containing said ink particles off of said slurry and into a first cyclonic action zone; and then (2) forwarding said foamy mist from said first cyclonic action zone into a second cyclonic action zone whereby said foamy mist is separated into an ink and liquid component fraction and a lighter air fraction.

29. Method as recited in claim 28 wherein said steps (1) and (2) are both performed within a single cyclone assembly unit.

30. Method as recited in claim 29 wherein said first and second cyclonic action zones are of approximate equal volume.

* * * * *